United States Patent [19]

Musselmann

[11] Patent Number: 5,011,065
[45] Date of Patent: Apr. 30, 1991

[54] SCREEN BASKET AND METHOD OF MANUFACTURE

[75] Inventor: Walter Musselmann, Heidenheim, Fed. Rep. of Germany

[73] Assignee: J.M. Voith GmbH, Fed. Rep. of Germany

[21] Appl. No.: 270,261

[22] Filed: Nov. 14, 1988

[30] Foreign Application Priority Data

Nov. 14, 1987 [DE] Fed. Rep. of Germany ....... 3738746
May 11, 1988 [DE] Fed. Rep. of Germany ....... 3816152

[51] Int. Cl.$^5$ .............................................. B23K 31/02
[52] U.S. Cl. .................................. 228/170; 29/163.6; 228/182; 209/411
[58] Field of Search ...................... 228/170, 178, 182; 29/160, 163.6; 209/395, 411, 412, 288; 241/79.3, 88.4; 409/61

[56] References Cited

U.S. PATENT DOCUMENTS

| 154,391 | 8/1874 | Hayden | 209/411 X |
| 225,919 | 3/1880 | Cobb | 209/411 X |
| 861,437 | 7/1907 | Cox | 241/88.4 |
| 944,780 | 12/1909 | Frickey | 241/88.4 |
| 1,636,592 | 7/1927 | Cushwa | 29/160 |
| 3,038,280 | 6/1962 | Dralle | 409/61 |
| 3,469,300 | 9/1969 | Nagin | 29/160 X |
| 4,193,503 | 3/1980 | Connolly | 209/393 |

Primary Examiner—Kenneth J. Ramsey
Attorney, Agent, or Firm—Charles W. Grimes

[57] ABSTRACT

A screen basket comprising a plurality of rods each positioned approximately parallel to the rotational symmetrical axis of the basket, a plurality of rings for connecting the plurality of rods, wherein the plurality of rods form screen slots therebetween, and wherein the plurality of rods is fastened to the plurality of rings by either welding or soldering. Each rod has a cross-section and each of said plurality of rings has a recess in the shape of the section of the cross-section of the plurality of rods. The recess is adapted to receive the plurality of rods therein.

11 Claims, 2 Drawing Sheets

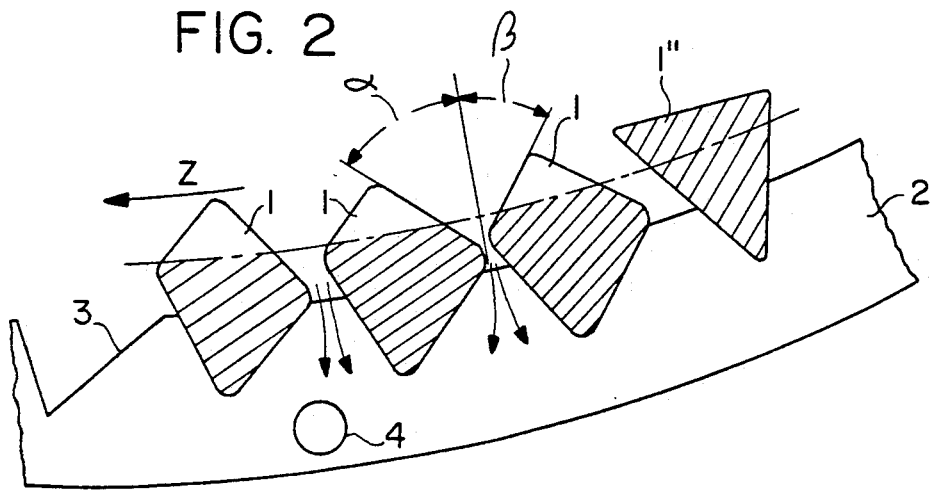
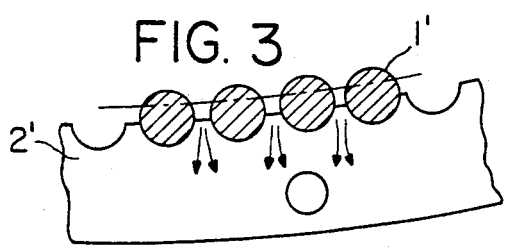
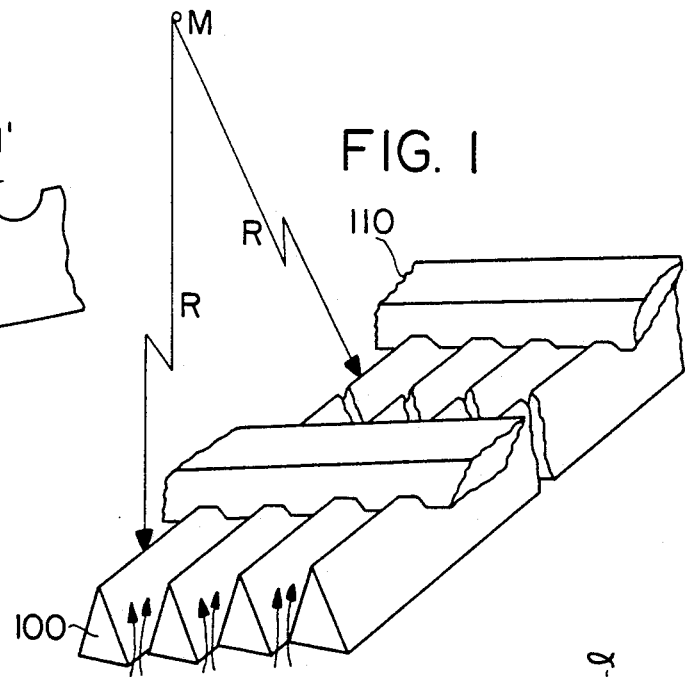
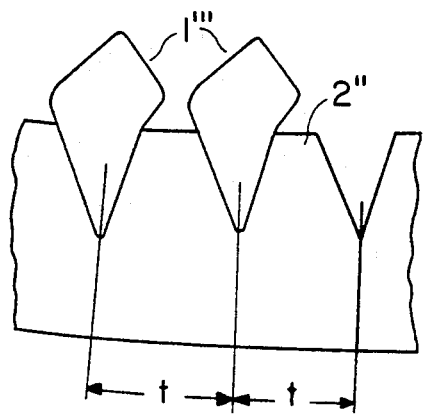
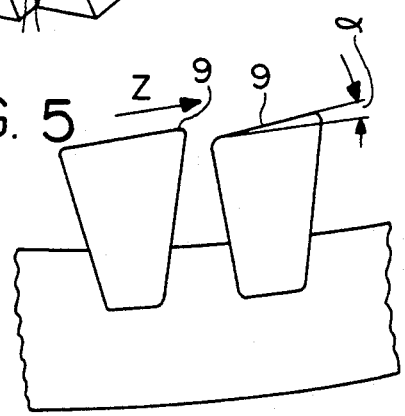

SCREEN BASKET AND METHOD OF MANUFACTURE

BACKGROUND OF THE INVENTION

1. Field of the Invention

The invention relates to a screen basket having a plurality of rods each positioned approximately parallel to the rotational symmetrical axis of said basket and having a plurality of rings connecting said plurality of rods with said plurality of rods forming screen slots therebetween and a method for its manufacture. Such a screen basket is known from DE-OS 33 27 422.

Since screen baskets with milled slots have the disadvantages of high labour cost caused by the milling itself and the remachining of the sharp edges resulting from milling, an attempt has been made, by welding on supporting elements, to manufacture such screen baskets with slots, which may be very fine, down to 0.15 mm slot width. For this purpose, rods with a rectangular cross-section have been favoured. The screens have a high efficiency per se, but it is very difficult to make the small gap widths with suitable accuracy and uniformity. Furthermore, there is also the great disadvantage that these screen baskets display only a low strength because of the generally only small triangular cross-sectional surface and because of the small permanently welded cross-section.

To be able to manufacture these screen baskets economically, the course adopted so far has been either to produce a flat wire mat which was later bent into the round, rotationally symmetrical shape of the screen basket, or, contrary to the final, later shape of the screen basket, the triangular rods have been wound up on a kind of lathe with a cylinder spirally onto parallel retaining rods. After having cut open this contrary screen basket—which has slots running practically in the peripheral direction—this screen basket mat has been stretched and then shaped into a screen basket in the opposite direction, on which the slots then run parallel to the axis of rotational symmetry between the triangular profile rods. These working methods lead to major sources of error in accuracy of the widths of the screen slots and also in respect of the given strength. Furthermore, after bending, supporting rings also had to be welded to the retaining elements of the profile rods to create the necessary strength for the screen basket. Despite this great deal of labour, however, there is the disadvantage of a not completely uniform gap width, which means that the efficiency of these screen baskets is relatively poor.

SUMMARY OF THE INVENTION

The object of the invention is to indicate a screen basket which is easy to manufacture and which possesses high strength and also a sufficient accuracy of the slot widths without sharp edges.

This problem is solved according to the invention with a screen basket of the aforementioned type by the features including a plurality of rods each positioned approximately parallel to the rotational symmetrical axis of said basket, each rod having a cross-section; a plurality of rings for connecting said plurality of rods, wherein said plurality of rods form screen slots therebetween, each of said plurality of rings has a recess in the shape of a section of the cross-section of said plurality of rods and adapted to receive the plurality of rods therein; and, means for fastening said plurality of rods to said plurality of rings, wherein said fastening means is either soldering or welding.

Use is made preferably of strong, compact profiles, i.e. not with a slender or even bent or greatly drawn-in cross-section (with rectangular angles smaller than 40° or greater than 230°) so that the screen basket is given an overall high strength from these strong profiles.

There are also further advantages over the screen baskets known until now, such as there is no change in the surface structure, especially on the inflow side of the screen surface even with different screen basket diameters, and that a different surface structure can be readily produced to influence the screening effect. The screen baskets exhibit a high precision of the desired gap width, since this desired position or any desired distance of the profile rods can be achieved by selecting the spacing of the notches or teeth in the supporting rings. The hob of the gear-cutting machine works with very high accuracy so that a tolerance of 0.1 even down to 0.05 mm is achievable for the width of he slots, depending on the dimensional tolerances of the profile of the rods.

DESCRIPTION OF THE DRAWINGS

The prior art is discussed below with reference to FIG. 1 and the invention described on he basis of the embodiments as per FIGS. 2, 3, 4, 5, 7 and 8 of the pertinent drawing, with this drawing showing a portion of the cross-section for the screen basket on an enlarged scale.

Similar parts are provided in the FIGS. with the same symbols, but these are each shown with different apostrophes.

DESCRIPTION OF THE PREFERRED EMBODIMENTS

Figure 6:
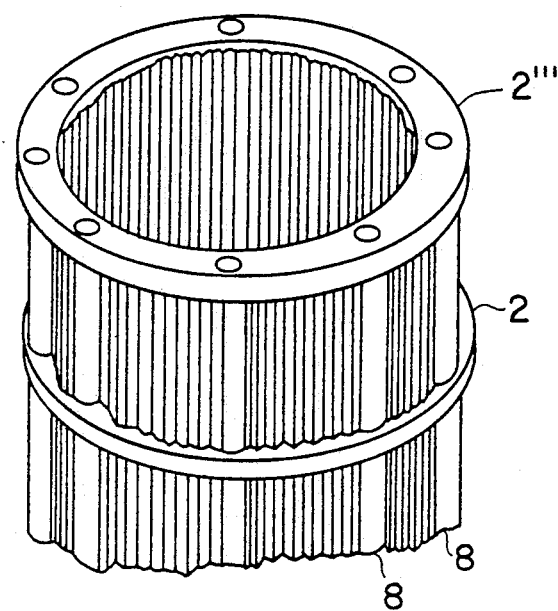
FIG. 6 shows a screen basket according to the invention in perspective in a further embodiment.

FIG. 1 shows in sections a screen basket according to the prior art, where triangular profile rods 100 are fastened to retaining webs 110 by e.g. friction welding or pressure welding. A virtually flat lattice work is produced which is rounded after cutting off to the necessary dimension into a screen basket. At one point there naturally occurs a seam in the longitudinal direction, which may also lead to a weak point in the screen basket. It is also possible, according to the indicated radius R with the centre point M, to apply profile wire spirally to a supporting cylinder with close mutual spacing of the individual windings on retaining rods 110 arranged parallel to the cylinder axis in mutually equal spacing, whereby the cylinder is generally arranged to be rotatable. A connection of the individual wire windings with the retaining rods 110 is then generally made by friction or pressure welding, after which the resulting screen basket—on which the slots running between the wire windings in the wrong direction, i.e. in peripheral direction—are opened at one point by a cut parallel to a retaining rod 110, then shaped into a flat lattice work and finally reshaped into a finished screen basket by rolling or rounding of the retaining rods 110. In the course of this, the above-described disadvantages arise.

In particular, the retaining rods 110 (the later retaining rings) are relatively thin and therefore do not form stable rings so that additional supporting rings of larger cross-section are placed on these and have to be welded to the retaining rings.

FIG. 2 shows the supporting ring 2 in whose grooves the four profile rods 1 and 1″ are fixed. The profile rods 1 have a cross-section whose outline is formed from a polygonal course, at this point with four corners and trapezoidal. One edge of the profile rods projects radially inwards to the inlet or inflow side of the screen surface, i.e. mainly to the central axis of the screen basket, and the opposite edge radially outwards. By turning to size of the profile rods radially inwards on a lathe see the chain line—a well-defined, desired "roughness" of the screen basket surface, considered coarsely, can be produced. Due to this, the (throughput) separating efficiency of the screen basket is often improved by the open screen area. Suitable welding methods are electrical, laser-beam and electron-beam welding or even oxyacetylene welding; however, a soldering method, especially brazing, is also suitable. Another suitable, high-quality soldering method is vacuum soldering, in which the entire screen basket is soldered under vacuum at temperatures around 1000° C. For an automated jointing method, however, one of the welding methods is more suitable.

A screen basket with reverse mode of operation is of course also possible, i.e. in which the inflow side of the screen surface lies radially outwards. Then the rings 2 in FIG. 2 would of course have only to be drawn with reversed curvature.

The method of manufacture is approximately as follows:

A pile of supporting rings 2 is clamped together and provided with the openings 4 on a gear-cutting machine; these openings correspond to the relevant section of the profile cross-section of the profile rods. Then, with the help of guide rods not shown here, which are stuck through the auxiliary holes 4 of the rings, a framework of supporting rings is made using spacer sleeves. The profile rods are placed into this framework after precise alignment, and first of all spot-welded and then permanently welded. Welding can also take place on an automatic welding system. The profile rods are permanently welded according to contour, i.e. mainly along the edges of the notches 3. The supporting rings 2 closing off the screen basket can be made somewhat reinforced, but otherwise no further reinforcements are necessary since a sufficient strength of the screen basket is already achieved as a result of the strong profile cross-section of the profile rods 1. As can be seen, an approximately trapezoidal cross-section of the profile rods has been selected here, so that with a suitable arrangement of the same or of the notches 3 different angles of the inlet-side edge a—angle alpha—and of the outlet-side edge b—angle $\beta$ can be obtained. In many cases this may improve the screening effect either in respect of separation or in respect of throughput. This can, however, also be attained approximately with precisely square, commercially available profile cross-sections. On the extreme right in FIG. 2, there is also an indication that triangular cross-sections 1″ can of course also be used. Suitable as welding method or jointing method is soldering or arc welding or also welding with laser beams or electron beams. The notches 3 are made for several supporting rings 2 jointly with, for example, a gear shaper or hobber. This permits a very high accuracy of the mutual spacing of the notches and thus of the screen slots.

It is indicated in FIG. 3 that round rods can also be used as profiles, which—e.g. even after turning to size along the chain line—then produce the screen slots and draw-in spaces of the screen slots between the profile rods. The two arrows in the Figures each indicate the direction of flow through the screen slots. The arrow Z shows in each Figure the direction of main flow related to the screen surface. It is substantially the same as the peripheral direction of the screen surface or screen baskets.

FIG. 5 shows a profile shape which is strong, and through the inclination of the "roof area" 9 located between the inlet edges against the peripheral and rotational flow direction Z of the suspension with the angle C produces a good discharge efficiency.

FIG. 6 shows represented in perspective a view of a screen basket according to the invention, namely for the case that, according to FIG. 4, the rods 1 with not so strong a profile, i.e. compact cross-section, as in FIG. 2 are used. In FIG. 4, a profile cross-section in the form of a pentagon is used, which is relatively slender due to the drawing-in on the right side. This means that automatic welding of the profile rods to the rings 2 becomes more difficult, and is possibly also not of such a god quality, so that the embodiment according to FIG. 6 should be used here, in which a stiffening of the screen basket is achieved by the strong longitudinal rods 8. These rods 8 are welded to the supporting rings 2. The supporting rings at the ends of the screen basket 2‴ can also be made even stronger to provide fastening means for the screen basket in the housing of the screen. Since the strength of the screen basket is substantially increased here through the longitudinal rods 8, the weld seams for the fastening of the profile rods 1, 1′ etc. may have a lower strength, e.g. a smaller cross-section.

In particular, the rods 1, 1′ etc. can then also be connected by bonding to the supporting rings 2.

Furthermore, the rods may then also be given a weaker, i.e. smaller, profile cross-section, so that more screen slots are obtainable for the screen basket.

This embodiment also makes possible smaller grooves of the supporting rings so that the "gear cutting" of the same can also be done by means of a slotting machine with the help of a dividing head which produces the slot division t (see FIG. 4) without having to frequently regrind the tool steel.

In the following the invention is explained on the basis of the embodiments represented in FIGS. 7 and 8 of the attached drawing.

In the rings 2 running vertically to the screen basket axis circular holes 13 precisely spaced are made with dividing head and drilling jig, these holes precisely corresponding to the cross-section of the rods 1′ to be accommodated there. Minor tolerance deviations are of course possible. Further, holes 4 are used for alignment of the rings. However, very large holes 4′—which can, for example, be provided at a point where a corresponding hole 13 for the rods 1′ has been left out—can be used simultaneously for stiffening during later operation in that very thick rods of cylindrical cross-section are inserted into them and permanently welded, e.g. by electrical welding. The rods 1′ may then exhibit a very small diameter so that the result is a large number of slots running parallel to the rotationally symmetrical axis of the screen basket. Depending on the kind of operation of the screen basket, the rods 1 may then be given a flattened, straight surface corresponding to the chain line by a turning operation radially inwards or radially outwards. FIG. 8 shows that rods 1′ or 1″ with angular section—e.g. trapezoidal or triangular—can be inserted into the rings 2″ or their recesses 3′ with suitable subsequent shaping. In the case of trapezoidal rods different angles alpha and beta in relation to the radials of the surfaces of the rods on the inflow side of the screen basket, i.e. of the inflow side of the fibres in the case of a fibre suspension, can be made or planned. In this case, for example, a rotor with blades may have the direction of rotation as per arrow Z.

Figure 7:
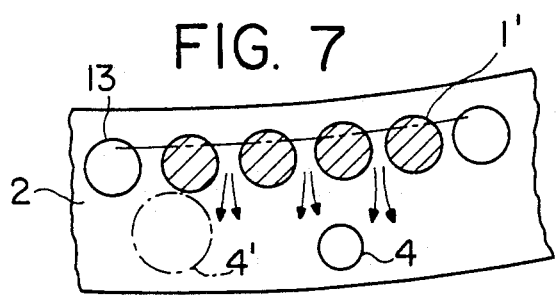
Figure 8:
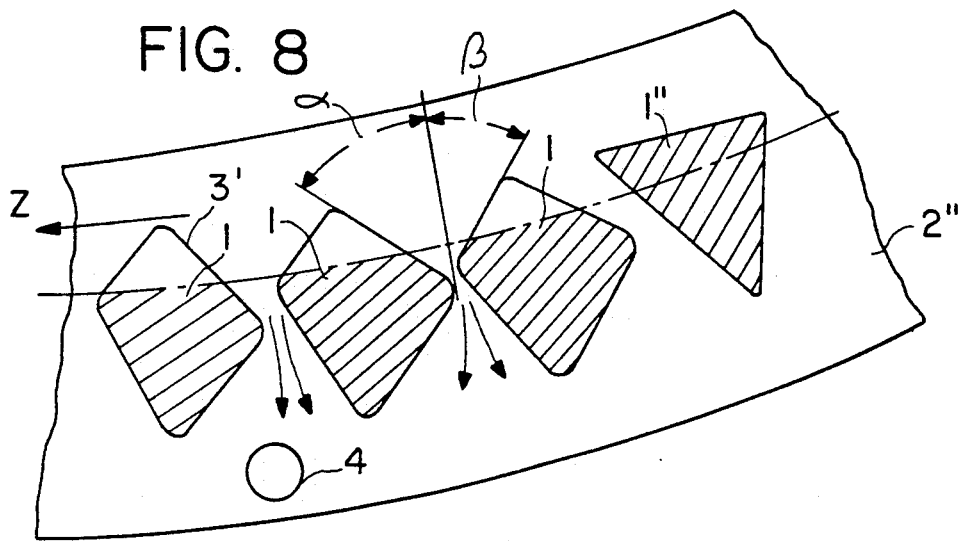

What is particularly simple is of course the embodiment according to FIG. 7, since the boreholes can be easily made. The screen slots may then be designed to be very close and their width may be smaller than 0.3 mm. Because of the mode of construction and manufacturing method of the screen basket, this width can be maintained very precisely.

I claim:

1. A screen basket comprising:
   a plurality of rods each positioned approximately parallel to the rotational symmetrical axis of said basket, each rod having a cross-section in the shape of a polygon or a triangle or a circle;
   a plurality of rings for connecting said plurality of rods, wherein said plurality of rods form screen slots therebetween, each of said plurality of rings has a recess, formed by a gear-cutting machine, in the shape of a section of the cross-section of said plurality of rods and adapted to receive the plurality of rods therein; and,
   means for fastening said plurality of rods to said plurality of rings, wherein said fastening means is either soldering or welding.

2. The screen basket of claim 1, wherein each of said plurality of rods has a cross-section with more than three corners, and wherein none of the corner angles is smaller than 40 degrees, at most one is smaller than 60 degrees, and none is greater than 230 degrees.

3. The screen basket of claim 1, further comprising a plurality of supporting rods which are positioned parallel to the rotation symmetrical axis to form with said plurality of rings a supporting cage for said plurality of rods.

4. The screen basket of claim 1, further comprising a plurality of supporting rods which are positioned parallel to the rotation symmetrical axis to form with said plurality of rings a supporting cage for said plurality of rods.

5. The screen basket of claim 4, wherein some of said plurality of supporting rods are positioned in a hole having a cross-section which corresponds to a cross-section of said plurality of supporting rods.

6. The screen basket of claim 5, wherein each hole is circular.

7. A method of manufacturing a screen basket having a plurality of rods positioned approximately parallel to the rotational symmetrical axis of said screen basket and having a plurality of supporting rings for connecting said plurality of rods, with said plurality of rods forming screen slots therebetween, said methods comprising:
   forming, by one of a gear-cutting machine or a slotting machine and a dividing head, tooth-like recesses in said plurality of supporting rings which recesses correspond to a section of the cross-section of said plurality of rods;
   inserting said plurality of rods into said recess, wherein the section of said cross-section of said plurality of rods corresponds to said recess; and,
   fastening, by solding or welding, said plurality of rods to said plurality of rings, wherein said cross-section of said plurality of rods has a radially projecting edge, and wherein the method further comprises removing the radially projecting edge of the cross-section of said plurality of rods by turning to the size of said screen basket on a lathe.

8. A method of manufacturing a screen basket having a plurality of rods positioned approximately parallel to the rotational symmetrical axis of said screen basket and having a plurality of supporting rings for connecting said plurality of rods, with said plurality of rods forming screen slots therebetween, said method comprising:
   forming, by a gear-cutting machine, tooth-like recesses in said plurality of supporting rings which recesses correspond to a section of the cross-section of said plurality of rods;
   inserting said plurality of rods into said recess, wherein the section of said cross-section of said plurality of rods corresponds to said recess, and wherein said cross-section of each of said plurality of rods is a polygon or a triangle or a circle; and,
   fastening, by soldering or welding, said plurality of rods to said plurality of rings.

9. The method of claim 8, wherein said cross-section of each of said plurality of rods has a radially projecting edge, and wherein the method further comprises removing the radially projecting edge of the cross-section of said plurality of rods.

10. The method of claim 8, furthering comprising using the cross-section of said plurality of rods which has more than three corners with none of the angles of the corner being smaller than 40 degrees, at most one of the angle being smaller than 60 degrees and no corner angle is greater than 140 degrees.

11. The method of claim 8, further comprising making in each of said plurality of supporting rings an internal tooth to form one of said recesses.

* * * * *